United States Patent Office 2,957,877
Patented Oct. 25, 1960

2,957,877

NEW PROCESS FOR THE PREPARATION OF ORGANIC ALKALOID-LIKE COMPOUNDS

Charles Ferdinand Huebner, Chatham, N.J., assignor to Ciba Pharmaceutical Products, Inc., Summit, N.J., a corporation of New Jersey No Drawing. Filed Apr. 1, 1957, Ser. No. 649,617

8 Claims. (Cl. 260—287)

This application is a continuation-in-part of my copending application, Serial No. 587,921, filed May 29, 1956 which is in turn a continuation-in-part of my application, Serial No. 581,367, filed April 30, 1956, which is in turn a continuation-in-part of my copending application, Serial No. 576,804, filed April 9, 1956.

This invention relates to a new process for the preparation of reserpine and compounds similar thereto, to certain compounds formed thereby and optical antipodes, racemates and salts thereof. More particularly, the inveniton relates to a process for the preparation of compounds of the following formula:

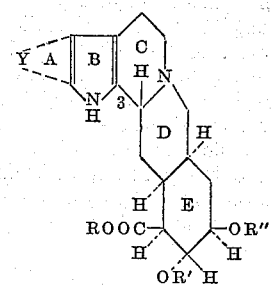

wherein Y represents a substituted or unsubstituted remainder of the benzene nucleus, R stands for a member of the group consisting of hydrogen and lower alkyl, R' represents a lower alkyl group and R" stands for hydrogen or an acyl radical, and salts thereof. Substituents in the benzene nucelus are for example a halogen atom, such as chlorine, bromine or fluorine; an unsubstituted or substituted amino group; or preferably lower alkoxy, e.g. methoxy, ethoxy or methylenedioxy. Substituents, if any, are advantageously in 10- and/or 11-position of the reserpine ring skeleton, preferably in 11-position. R if lower alkyl, and R' are especially methyl or ethyl. An acyl radical is for example the radical of an aromatic, aliphatic, heterocyclic or araliphatic carboxylic or sulfonic acid, such as a lower fatty acid, e.g. acetic acid or propionic acid; a phenyl carboxylic acid such as an alkoxyphenyl carboxylic acid, e.g. 4-methoxybenzoic acid, 3,4-dimethoxybenzoic acid, 3,4,5-trimethoxybenzoic acid, 3,4-methylenedioxybenzoic acid, 3,4-diethoxybenzoic acid, an O-carbalkoxysyringic acid such as O-carbethoxy-syringic acid; phenyl aliphatic carboxylic acid, such as an alkoxycinnamic acid, e.g. 3,4,5-trimethoxy-cinnamic acid; a monocyclic heterocyclic carboxylic acid such as a furane carboxylic acid, e.g. furane-2-carboxylic acid; a pyridine carboxylic acid, e.g. nioctinic or iso-nicotinic acid; a thiophene carboxylic acid, e.g. thiophene-2-carboxylic acid; or an arylsulfonic acid such as benzenesulfonic acid or p-toluenesulfonic acid.

These compounds may be laevo-rotatory, dextro-rotatory or racemates. The dextro-rotatory compounds and racemates are new. Also new are compounds, wherein Y, R and R" have the meaning given above and R' represents a lower alkyl group having at least two carbon atoms, or wherein R, R' and R" have the meaning given below the first formula and Y represents the substituted remainder of a benzene nucleus other than that in reserpine. The compounds obtained according to the new process, laevo-rotatory, dextro-rotatory and racemic, in which R and R" are alkyl and acyl groups respectively, have valuable pharmacological activity. They show a hypotensive and sedative activity and can be used as medicaments for the treatment of anxiety, nervousness, tension and mental disorders. Especially valuable in this respect are compounds of the formula:

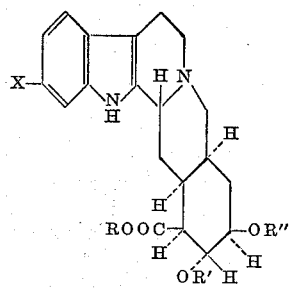

wherein X stands for hydrogen or methoxy, R and R' stand for methyl or ethyl and R" represents the acetyl, 4-methoxybenzoyl, 3,4-dimethoxybenzoyl, 3,4,5-trimethoxybenzoyl, 3,4-methylenedioxybenzoyl, O-carbethoxy-syringoyl, cinnamoyl, 4-methoxy-cinnamoyl, 3,4-dimethoxy-cinnamoyl or 3,4,5-trimethoxy-cinnamoyl, furoyl-2 or nicotinoyl radical. The other compounds of the general formula indicated in the beginning especially those in which R and/or R" represent hydrogen are intermediates for the preparation of the pharmacologically active compounds into which they can be converted according to known methods, such as those outlined hereinafter.

The new process of my invention allows for the first time to produce by total synthesis the compounds as outlined above such as reserpine, rescinnamine or deserpidine, which have activity as sedative and hypotensive agents. The laevo-rotatory compounds, as far as they are known, have heretofore been obtainable only from natural materials, e.g. plant material of Rauwolfia species, or from starting materials derived therefrom. The dextrorotatory and racemic compounds could not be obtained from such natural sources and are for the first time obtained by the new process of the invention.

This process consists in converting a compound of the formula:

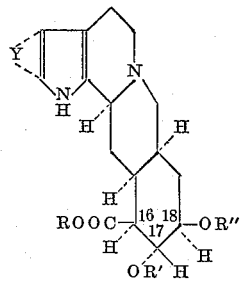

wherein Y, R, R' and R" have the meaning given above, or salts thereof into a compound of the formula:

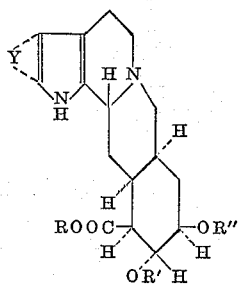

wherein Y, R, R' and R'' have the aforesaid meaning, or salts thereof. This conversion can be accomplished by isomerization of the starting material in an acid medium and recovering the desired compound having the above depicted formula or a salt thereof.

Acids used in the isomerization step are more especially lower aliphatic carboxylic acids, such as formic, acetic or propionic acid, more particularly glacial acetic acid; aromatic sulfonic acids, such as p-toluene sulfonic acid; or strong mineral acids such as hydrohalic acids, e.g. hydrogen chloride; or mixtures of such acids. Thus, aromatic sulfonic acids are advantageously used together with a lower aliphatic carboxylic acid mentioned above, for example, p-toluene sulfonic acid in acetic acid.

The optimum yield in such an isomerization reaction can be obtained by removing the desired product from the reaction milieu thus displacing the reaction equilibrium to the right. The removal can be accomplished by separation of the product either as a base or as a salt from the starting material by virtue of their relative solubilities in a given solvent. Thus, in the isomerization of 3-iso-reserpine to reserpine in glacial acetic acid, reserpine or a salt thereof can be separated from the starting material or a salt thereof either by adsorption on a suitable material such as alumina or paper, or by fractional crystallization from a solvent. The starting material separated from the desired end product can be recycled into the isomerization process, thus enhancing the overall yield of the reaction.

The reaction may be carried out in the absence or presence of a solvent, at room temperature or preferably at an elevated temperature, in an open vessel or under pressure, preferably in an atmosphere of nitrogen.

According to the conditions of the isomerization reaction, the products may be obtained in the form of their salts. As salts especially acid addition salts are contemplated, such as those with hydrohalic acids, e.g. hydrochloric acid; nitric acid, sulfuric acid, phosphoric acids, perchloric, acetic, citric, oxalic, tartaric, ascorbic, salicylic, p-amino-salicylic, 2-acetyl-salicylic acid, methane sulfonic, hydroxyethane sulfonic, p-toluene sulfonic acid. The bases are converted into the salts in the customary manner, e.g. by treatment with an aqueous solution of an alkali metal hydroxide such as sodium hydroxide, and the free bases can be obtained as usual from the salts, for example, by treatment of an ethanolic solution of the base with the free acid. Compounds containing a free carboxylic acid group may be obtained in the form of their metal salts, e.g. alkali or alkaline earth metal salts, by treatment with a base, e.g. sodium hydroxide.

The invention comprises also any process, wherein an intermediate obtainable at any stage of the process is used as starting material and the remaining steps are carried out.

The starting materials used in the process are known and may be, for example, obtained synthetically in the following manner:

p-Quinone is reacted with 1,4-butadiene-1-carboxylic acid in a Diels-Alder addition. The resulting 5,8-dioxo-1α,4,4aα,5,8aα-hexahydronaphthalene-1β-carboxylic acid of the formula:

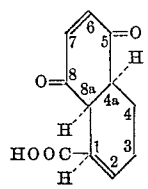

is then reduced with sodium borohydride to 5β-hydroxy-8-oxo-1α,4,4aα,5α,8,8aα-hexahydronaphthalene-1β-carboxylic acid which yields by oxidation with perbenzoic acid the 2,3α,-oxido-5β-hydroxy-8-oxo-1α,2β,3β,4,4aα,5α, 8,8aα,-octahydronaphthalene-1β-carboxylic acid of the formula:

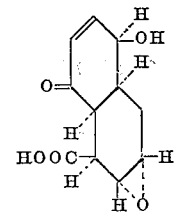

This compound, after esterification with diazomethane is subjected to a Meerwein-Ponndorf reduction with aluminum isopropoxide to yield the (1β→8β)-lactone of 3,5β-oxido-8β-hydroxy-3α,4,4aα,5α,8α,8aα-hexahydronaphthalene-1β-carboxylic acid of the formula:

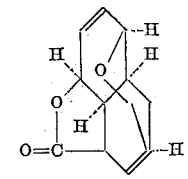

which by addition of a lower alkanol to the double bond in 1-position is converted into a (1β→8β)-lactone of 2α-lower alkoxy-3,5β-oxido-8β-hydroxy-1α,2β,3α,4,4aα,5α, 8α,8aα-octahydronaphthalene-1β-carboxylic acid. Addition of bromohydrine to the double bond in 6-position results in the (1β→8β)-lactone of 2α-lower alkoxy-3,5β-oxido-6α-bromo-7β,8β-dihydroxy-1α,2β,3α,4,4aα,5α,6β, 7α,8α,8aα-decahydronaphthalene-1β-carboxylic acid. Oxidation with chromic acid to the corresponding 7-oxo-compound, followed by reduction with zinc and acetic acid yields a 2-lower alkoxy-3β-hydroxy-7-oxo-1α,2β,3α, 4,4aα,7,8,8aα-octahydronaphthalene-1β-carboxylic acid of the formula:

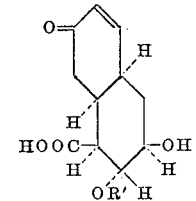

Esterification with diazomethane, acetylation with acetic acid anhydride in pyridine, oxidation with osmium tetroxide and oxidative degradation with periodic acid gives a 2α-lower alkoxy-3β-acetoxy-5β-aldehydo-6β-carboxymethyl-cyclohexane-1β-carboxylic acid methyl ester. This after esterification with diazomethane is condensed with a tryptamine of the formula:

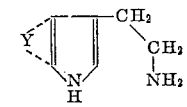

wherein Y is a substituted or unsubstituted remainder of a benzene nucleus, to yield a compound of the formula:

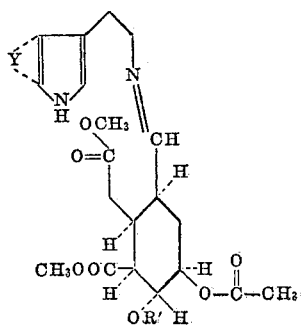

Reduction with sodium borohydride and ring closure with heating results in a compound of the formula:

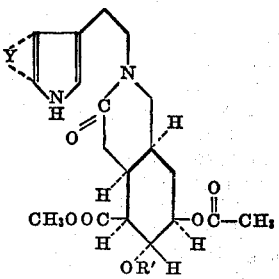

which by treatment with phosphorus oxychloride is converted into a compound of the formula:

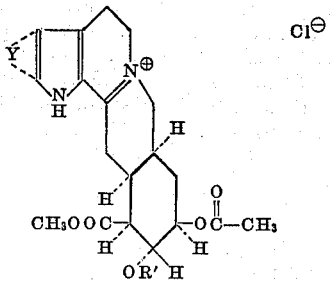

The latter may be reduced to a compound of the formula:

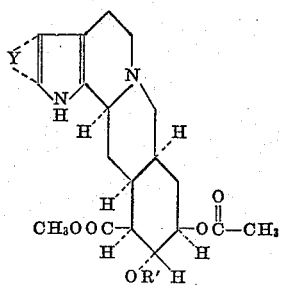

by catalytic reduction and if desired may be converted into the desired starting materials of the process of this invention. Thus, by mild hydrolysis an esterified acid having a free hydroxyl group may be obtained, which can be converted into an O-esterified acid ester. Upon hydrolysis a diester such as described above may further yield an acid having a free hydroxyl group, the carboxyl group and the free hydroxyl group of which may be esterified by methods known per se.

The starting materials can be used in the form of the optically active antipodes or the racemates. Racemates obtained in any stage of the process can be resolved to the optically active antipodes and may be used in either form for the remaining steps. Final compounds, if racemates, may also be resolved. The usual method of resolving is used, e.g. reaction of the racemate with an optically active base or acid, as the case may be, and separating the resulting isomeric salts by fractional crystallization, and setting free the desired optically active compound.

In the compounds obtained free carboxyl groups may be converted into lower carbalkoxy groups in the usual manner, for example, by treatment with lower diazoalkanes, or lower alkanols in the presence of esterification catalysts. Esterified carboxyl groups may be hydrolyzed, for example, by treatment with alkaline agents, e.g. alkali metal hydroxides in lower alkanols. Free hydroxyl groups may be esterified in the usual manner, preferably by reaction with acid halides, e.g. chlorides, or acid anhydrides. These subsequent reactions can be combined in any appropriate way, thus allowing to vary the final product of the process according to the formula given in the beginning.

My invention also comprises the new compounds of the formula:

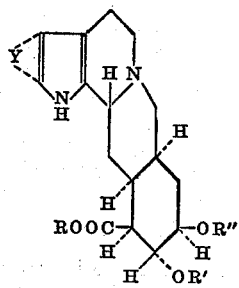

wherein Y represents the substituted remainder of a benzene nucleus other than that in reserpine, R stands for hydrogen and lower alkyl, R' for lower alkyl and R" represents hydrogen or acyl, and salts thereof, and the new compounds of the above formula wherein Y represents the unsubstituted or substituted remainder of a benzene nucleus, R stands for hydrogen or lower alkyl, R' for a lower alkyl group having at least two carbon atoms and R" represents hydrogen and acyl, and salts of such compounds.

Also contemplated to be comprised by my invention are racemates and d-antipodes of compounds of the above formula wherein Y represents an unsubstituted or substituted remainder of the benzene nucleus, R stands for hydrogen or lower alkyl, R' for lower alkyl and R" represents hydrogen or an acyl residue, and salts of such compounds. Salts are especially acid addition salts such as those with the acids mentioned above.

The examples which follow are given in the way of illustration and shall not be construed as a limitation. Many modifications will appear obvious to one skilled in the art and it is intended that such obvious modifications are also comprised by my invention. Temperatures are given in degrees centigrade.

*Example 1*

1 g. of laevo-rotatory 3-iso-reserpine is refluxed in 35 ml. of glacial acetic acid for 24 hours under an atmosphere of nitrogen. Most of the glacial acetic acid is then removed under reduced pressure, the mixture diluted with water, basified with ammonia and extracted with 50 ml. of chloroform. The chloroform is washed with water, dried over sodium sulfate and distilled to dryenss under reduced pressure. The residue is dissolved in 10 ml. hot ethanol and on cooling the mixture of reserpine and 3-iso-reserpine, crystallizes. It is filtered and stirred for 10 minutes with 7 ml. of ethyl acetate at room temperature. 3-iso-reserpine is readily soluble, whereas reserpine is but sparingly soluble under these conditions. The reserpine is filtered off and washed with a little ethyl acetate to yield 0.25 g. of reserpine of melting point 250–265°. It is purified by recrystallization from the mixture of methylene dichloride-methanol. Since reserpine and 3-iso-reserpine are stable to refluxing in acetic acid, and the separation of reserpine from 3-iso-reserpine is simple, the 3-iso-reserpine can be repeatedly recycled to give a good yield in the overall conversion of 3-iso-reserpine to reserpine.

*Example 2*

1.00 g. of 3-iso-reserpine is refluxed with 0.35 g. of p-toluene sulfonic acid for two hours in 10 ml. of collidine. The mixture is diluted with 50 ml. of chloroform and shaken with an excess of dilute aqueous ammonia. After drying the chloroform solution over anhydrous sodium sulfate, the solvent is removed by distillation under reduced pressure. From the crude gummy mixture, reserpine is separated from the starting material, 3-iso-reserpine, by fractional crystallization as described in Example 1.

The separation can also be carried out by chromatography.

Example 3

1.00 g. 3-iso-reserpine is refluxed in 25 ml. of a 3 N solution of hydrogen chloride in anhydrous ethanol for 18 hours. The solvent is removed by distillation under reduced pressure, the residue shaken with a mixture of chloroform and an excess of dilute aqueous ammonia, and the chloroform extract dried over anhydrous sodium sulfate and evaporated to dryness under reduced pressure. Reserpine is separated from the crude mixture as described in Example 1.

Example 4

1.00 g. of O-acetyl methyl 3-iso-reserpate is refluxed for 18 hours in 25 ml. of acetic acid. Most of the acetic acid is distilled off under reduced pressure, the solution made basic with dilute ammonia and extracted with chloroform. Evaporation of the latter yields the crude mixture of O-acetyl methyl reserpate and O-acetyl methyl 3-iso-reserpate. The desired pharmacologically active O-acetyl methyl reserpate is separated by placing the mixture on a formamide-impregnated cellulose chromatographic column and eluting with a 1:1-mixture of benzene-cyclohexane. The iso-compound is eluted first. The separation may be observed by the fluorescence of these alkaloidal materials on the column under ultraviolet light. Evaporation of the eluate containing O-acetyl methyl reserpate and recrystallization of the residue from acetone yields pure O-acetyl methyl reserpate, M.P. 297–298°.

Example 5

1.00 g. of 3-iso-deserpidine and 0.5 g. of p-toluene sulfonic acid are refluxed in 25 ml. of acetic acid for 24 hours. Most of the solvent is removed by distillation under reduced pressure and the mixture shaken with 50 ml. of chloroform and an excess of dilute aqueous ammonia. The chloroform layer is dried over anhydrous sodium sulfate and evaporated to dryness under reduced pressure. The residue is dissolved in 5 ml. of methanol at room temperature, whereupon the deserpidine soon crystallizes. It is filtered off and recrystallized from methanol, M.P. 224–227°. 3-iso-deserpidine remains in the methanol mother liquors.

Alternatively, the separation can be made by chromatography as described in Example 4, whereby 3-iso-deserpidine is eluted first from the column.

If in the foregoing examples the racemic 3-iso-compounds are used as starting materials they are isomerized to the dl-compounds with normal configuration at center 3. Thus, starting from dl-methyl-O-acetyl-iso-reserpate (M.P. 267–268°) there is obtained the dl-methyl-O-acetyl-reserpate, which is recrystallized from acetone.

*Analysis.*—Calculated: C: 65.77; H: 7:05; N: 6.14%. Found: C: 65.65; N: 7.04; N: 6.21%.

Example 6

1 g. of racemic 3-iso-reserpine obtained by the method outlined above is refluxed in 40 ml. of glacial acetic acid for 26 hours under an atmosphere of nitrogen. Most of the glacial acetic acid is then removed under reduced pressure, the mixture diluted with water, made alkaline with ammonium hydroxide and extracted with 100 ml. of chloroform. The chloroform is washed with water, dried over sodium sulfate and evaporated to dryness under reduced pressure. The residue is triturated with ethanol whereby crystals are formed. Paper chromatographic analysis reveals that the residue consists of a mixture of dl-reserpine and dl-3-iso-reserpine, the Rf values being identical with those of the natural optically active compounds. By preparative separation on paper sheet the pure racemic compounds are isolated. The infrared spectrum of the dl-reserpine shows the following characteristic strong bands: 2.92$\mu$; 5.76$\mu$; 5.83$\mu$; 6.13$\mu$; 6.28$\mu$; 6.67$\mu$; (in Nujol).

Example 7

3 g. of dl-3-iso-reserpic acid obtained by hydrolyzing dl-O-acetyl-3-iso-reserpic acid methyl ester with a methanolic potassium hydroxide solution, is refluxed in 100 ml. of anhydrous 3-N ethanolic hydrogen chloride for 20 hours. The solvent is removed under reduced pressure, the residue shaken with a mixture of chloroform and 200 ml. of 1.5 N-aqueous ammonia, the chloroform extract dried over anhydrous sodium sulfate and evaporated to dryness under reduced pressure. From the crude mixture dl-reserpic acid is obtained by fractional crystallization in a mixture of acetone and methylene chloride. It forms a hydrochloride which is soluble in water. The free dl-reserpic acid exhibits characteristic absorption bands in the infrared region of the spectrum when suspended in solid form in a hydrocarbon oil (Nujol) at the following frequencies, expressed in reciprocal centimeters: 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 829, 804, 750 and 720.

In a manner analogous to that described in this example dl-deserpidic acid is obtained from dl-3-iso-deserpidic acid. The latter is obtained by the method outlined above. dl-Deserpidic acid crystallizes from methanol and shows in the infrared spectrum in "Nujol" (mineral oil) the following absorption bands: strong bands at 3379–3201, 1580, 1454, 1377, 1318, 1199, 1137, 1082, 740 cm.$^{-1}$; medium bands at 1709, 1241, 1227, 1190, 1025, 1009, 977 cm.$^{-1}$; weak bands at 925, 900, 877, 849 cm.$^{-1}$; shoulders at 1301; 1156; 837; 765; 720 cm.$^{-1}$.

Example 8

1.5 g. of dl-methyl-3-iso-reserpate is refluxed for 24 hours in 22 ml. of acetic acid. Most of the acetic acid is distilled off under reduced pressure, the solution made alkaline with dilute ammonium hydroxide and extracted with ethylene trichloride. Evaporation of the latter yields the crude mixture of dl-methyl-reserpate and dl-methyl-3-iso-reserpate. This mixture is separated by placing it on a formamide-impregnated cellulose chromatographic column and eluting with a 1:1-mixture of benzene-cyclohexane. The iso-compound is eluted first. Exaporation of the eluate and recrystallization from chloroformacetone yields pure dl-methyl-reserpate, which exhibits in the infrared region of the spectrum when suspended in solid form in a hydrocarbon oil (Nujol) absorption bands at the following frequencies expressed in reciprocal centimeters: 3510, 3365, 2850–2950 (broad band), 1724, 1632, 1578, 1500, 1465, 1380, 1362, 1355, 1340, 1332, 1312, 1298, 1268, 1245, 1225, 1202, 1155, 1088, 1068, 1055, 1040, 1030, 1020, 1008, 970, 940, 912, 890, 860, 848, 835, 785, 770, 753, 720, 710, 655 and 625.

Example 9

0.5 g. dl-3-iso-deserpidine and 0.25 g. of p-toluene sulfonic acid are refluxed in 30 ml. of acetic acid for 20 hours. Most of the solvent is removed by distillation under reduced pressure and the mixture shaken with 30 ml. of chloroform and an excess of dilute aqueous ammonia. The chloroform layer is dried over anhydrous sodium sulfate and evaporated to dryness under reduced pressure. The residue consists, according to the results of the paper chromatographic analysis, of a mixture of dl-3-iso-deserpidine and dl-deserpidine. The separation of the two components is effected on a cellulose column as described in Example 8.

The dl-deserpidine forms crystalline salts such as the hydrochloride, a nitrate, or a picrate. It dissolves in an excess of dilute acetic acid, thus forming the acetate. Its infrared absorption spectrum (in Nujol) shows the following strong bands: 1731, 1715, 1590, 1504, 1415, 1332, 1274, 1250, 1226, 1124, 1100, 1005, 877, 761, 728 cm.$^{-1}$.

In an analogous manner to that described in these examples and starting from dl-methyl-3-iso-deserpidate which may be obtained by synthesis as outlined hereinbefore there is obtained dl-methyl-deserpidate showing in the U.V. absorption spectrum, taken in ethanol solution, the following bands: maxima: λ=222 mμ (ε=33,000), 281-282 mμ (ε=7510), 289 mμ (ε=6400); minima: λ=248 mμ (ε=2000) and 288 mμ (ε=6360).

What is claimed is:

1. In a process for the preparation of a member selected from the group consisting of compounds of the formula:

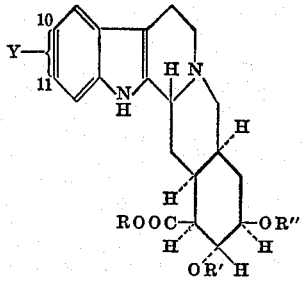

in which Y attached to one of the positions 10 and 11 represents a member of the group consisting of hydrogen and lower alkoxy, R stands for a member selected from the group consisting of hydrogen and lower alkyl, R' stands for a lower alkyl radical and R" represents a member of the group consisting of hydrogen, the acyl radical of lower fatty acid, the acyl radical of lower alkoxy-phenyl carboxylic acid, the acyl radical of O-carbo-lower alkoxy-syringic acid, the acyl radical of lower alkoxy-cinnamic acid, the acyl radical of furane carboxylic acid and the acyl radical of pyridine carboxylic acid, and acid addition salts thereof, the steps which comprise contacting a member of the group consisting of compounds of the formula:

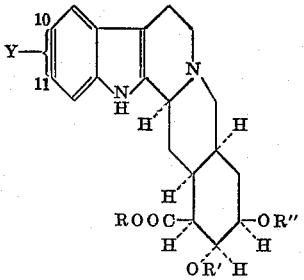

wherein Y, R, R', and R" have the meaning given above with a member of the group consisting of lower alkanoic acid, p-toluene sulfonic acid, strong mineral acid and the mixture of such acids, and recovering a member of the group consisting of the desired compound having the configuration shown in the first depicted formula, and acid addition salts thereof.

2. A process according to claim 1, wherein a lower alkanoic acid is used.

3. A process according to claim 2, wherein glacial acetic acid is used.

4. A process according to claim 1, wherein p-toluene sulfonic acid is used.

5. A process according to claim 1, wherein a strong acid is used.

6. A process according to claim 1, wherein a mixture of acetic acid and p-toluene sulfonic acid is used.

7. In a process for the preparation of a member of the group consisting of reserpine and salts thereof, the steps which comprise contacting a member of the group consisting of 3-iso-reserpine of the formula:

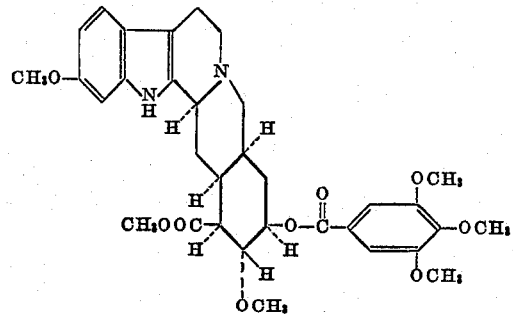

and acid addition salts thereof, with glacial acetic acid and recovering reserpine.

8. In a process for the preparation of a member of the group consisting of deserpidine and salts thereof, the steps which comprise contacting a member of the group consisting of 3-iso-deserpidine of the formula:

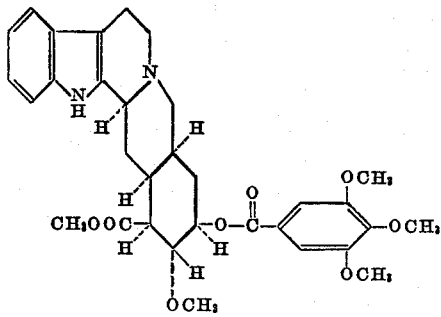

and acid addition salts thereof, with a mixture of p-toluene sulfonic acid and acetic acid and recovering deserpidine.

References Cited in the file of this patent

UNITED STATES PATENTS 2,752,351 Schlittler _____ June 26, 1956
2,824,874 Schlittler _____ Feb. 25, 1958

OTHER REFERENCES

Woodward: Jour. Am. Chem. Soc., vol. 78, pp. 2023-2025 (May 1956).

Diassi: Jour. Am. Chem. Soc., vol. 77, pp. 4687-4688 (Sept. 5, 1955).

Huebner: Experientia, vol. 12, pp. 249-250 (July 1956).

Experientia, vol. 11, pp. 302-304 (1955).

MacPhillamy et al.: Journ. of the American Chemical Society, vol. 77, pp. 4335-4343 (1955).

MacPhillamy et al.: Journ. of the American Chemical Society, vol. 77, pp. 1071-1072 (1955).

UNITED STATES PATENT OFFICE
CERTIFICATION OF CORRECTION

Patent No. 2,957,877            October 25, 1960

Charles Ferdinand Huebner

It is hereby certified that error appears in the above numbered patent requiring correction and that the said Letters Patent should read as corrected below.

Column 3, line 60, for "1α,4,4aα,5,8aα" read -- 1α,4,4aα,5,8,8aα --; lines 63 to 70, the formula should appear as shown below instead of as in the patent:

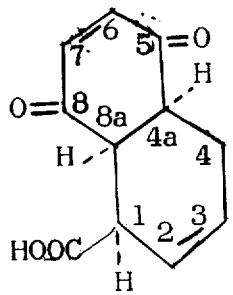

column 4, lines 18 to 25, the formula should appear as shown below instead of as in the patent:

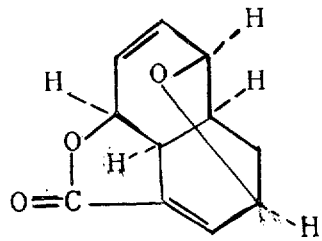

column 6, lines 74 and 75, for "chromatography." read -- chromatography, e.g. paper chromatography. --.

Signed and sealed this 29th day of August 1961.

(SEAL)
Attest:

ERNEST W. SWIDER
Attesting Officer

DAVID L. LADD
Commissioner of Patents